March 24, 1931. E. C. HERTHEL 1,797,262
ART OF REFINING HYDROCARBONS
Filed Sept. 14, 1928
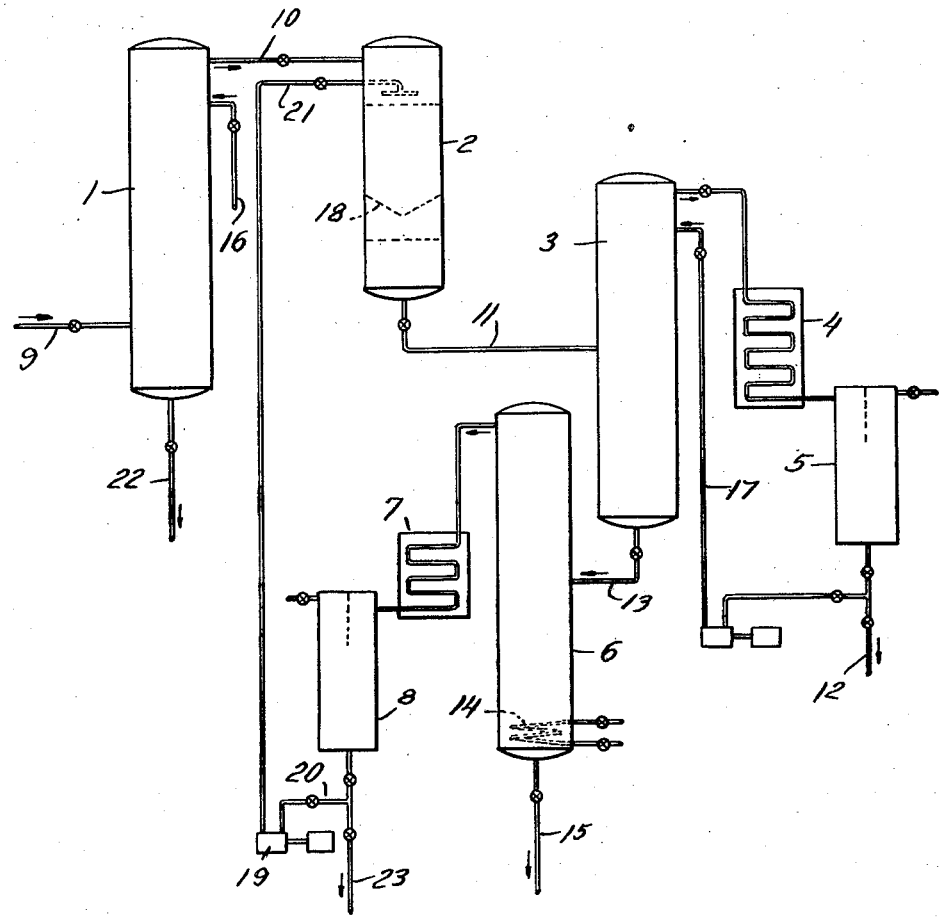
INVENTOR
Eugene C. Herthel
BY
ATTORNEYS Patented Mar. 24, 1931

1,797,262

UNITED STATES PATENT OFFICE

EUGENE C. HERTHEL, OF CHICAGO, ILLINOIS, ASSIGNOR TO SINCLAIR REFINING COMPANY, OF NEW YORK, N. Y., A CORPORATION OF MAINE

ART OF REFINING HYDROCARBONS

Application filed September 14, 1928. Serial No. 305,905.

This invention relates to improvements in the vapor phase refining of hydrocarbons by passage of the hydrocarbon vapors through an adsorptive catalyst, such as fuller's earth, to separate therefrom unstable unsaturated constituents unsuitable as components of the desired product by polymerization to form higher boiling polymers. This general type of refining operation is well known, and is of special value as applied to the refining of gasoline, particularly cracked gasoline, intended for use as motor fuel for removal of unstable constituents or constituents of bad color or bad odor without removal of unsaturated constituents having anti-knock properties. The improvements of this invention likewise are of special value as applied to the refining of such motor fuel gasolines, but the invention is also of more general application.

When hydrocarbon vapors are passed through fuller's earth, for example, certain unsaturated constituents such as the di-olefines, to the extent that they are present, are polymerized to form polymers higher boiling than the original unsaturated constituents which then can be separated from the vapors, for example, by fractional condensation either in the refining operation proper or in some subsequent fractionating operation.

As generally practiced, this general method has involved charging of a suitable receptacle with a bath of the adsorptive catalyst, passing the vapors to be refined through this receptacle in contact with the adsorptive catalyst until the catalyst has lost its effectiveness, discharging the spent adsorptive catalyst, replacing the discharged adsorptive catalyst with a fresh charge of the adsorptive catalyst, and so on. The period of operation is thus limited to that period over which the adsorptive catalyst remains sufficiently active to effect the required refining treatment. The adsorptive catalysts commonly used, fuller's earth for example, moreover assume an apparent state of inactivity before the catalyst itself actually becomes ineffective by choking with high boiling polymers produced by the vapor-catalyst contact. This difficulty is particularly acute where the vapors to be refined contain a large proportion of material polymerizing on contact with the adsorptive catalyst, in the treatment of gasoline produced by severe vapor phase cracking for example. The period of operation is thus further limited.

This invention provides an improved method of refining hydrocarbon vapors by which the period of effective activity of the adsorptive catalyst is prolonged, by which the useful period of operation is prolonged and by which several further advantages are obtained.

According to the present invention, the hydrocarbon vapors to be refined, including with advantage higher boiling vapors as well as vapors forming the desired product, are passed through the adsorptive catalyst, the polymers produced by the vapor-catalyst contact and associated condensed oil components are separated from the vapors after passage through the adsorptive catalyst, the oil components of this separated polymer mixture are distilled therefrom and thus separated from residual tar including the high boiling polymers and the distilled oil components, as a condensate, are passed through the adsorptive catalyst with the hydrocarbon vapors to be refined during the refining operation as a liquid washing agent. This condensate is a particularly effective washing agent. In one aspect, the present invention provides a cyclic application of a particularly effective washing agent, the cycle comprising separation of the oil washing agent from associated high boiling polymers after separation from the refined hydrocarbon vapors discharged from the refining operation by vaporization therefrom, condensation of the oil washing agent free from these high boiling polymers and returning the condensed oil to the refining operation as a washing agent. It is advantageous, in carrying out the invention, to subject the total vapor mixture resulting from the vapor-catalyst contact including the polymers so produced and the oil washing agent to a fractionating operation and to separate and condense in this fractionating operation all constituents higher boiling than suitable as components of the desired product, to minimize retention in or on the adsorptive catalyst of such polymers or the oil washing agent.

The invention will be further described in connection with the accompanying drawing which illustrates, diagrammatically and conventionally, one form of apparatus adapted for carrying out the invention, but it will be understood that the invention can be carried out in other and different forms of apparatus.

The apparatus illustrated comprises a fractionating tower 1, a refining tower 2 another fractionating tower 3, a condenser 4 and a receiver 5, a vaporizing tower 6, and another condenser 7 and another receiver 8. Raw vapors are supplied to the lower end of tower 1 through connection 9, the vapor mixture escaping from the upper end of tower 1 is conveyed to the upper end of tower 2 through connection 10, the vapor mixture escaping from the lower end of tower 2 is discharged into tower 3 at an intermediate point through connection 11, the vapors escaping from the upper end of tower 3 are condensed in the condenser 4 and the resulting condensate, after separation from any uncondensed vapors and gases in receiver 5, discharged, as the refined product, through connection 12. Material condensed and separated in tower 3 is discharged into tower 6 at an intermediate point through connection 13, heat is supplied to the lower end of this tower by means of heating coil 14, unvaporized residual constituents are discharged from the lower end of this tower through connection 15 and the vaporized oil constituents are condensed in the condenser 7 and the resulting condensate collected in receiver 8. The towers 1 and 6 may be of open baffle type or of so-called "bubble" type. The tower 3 is with advantage of "bubble" type or other type adapted to permit close fractionation. Condensation in tower 1 may be controlled by direct introduction of a refluxing agent, such as an oil fraction, through connection 16, or by circulation of a cooling medium through cooling coils (not illustrated) in the upper end of the tower. Condensation in tower 3 may also be controlled by direct introduction of a refluxing agent, through connection 17, or by circulation of a cooling medium through cooling coils (not illustrated) in the upper end of the tower. The lower end of tower 6 may be heated by supplying steam to the heating coil 14 or, for example, by circulating hot condensate from the lower end of tower 1 through the heating coil 14. In the refining tower 2, the hydrocarbon vapors are passed downwardly through a charge of an adsorptive catalyst, such as 40–60 or 60–80 fuller's earth, supported upon a foraminous partition 18. Pump 19 is provided for supplying condensate from receiver 8 to the upper end of the refining tower 2 through connections 20 and 21 as a liquid washing agent in accordance with the invention.

The apparatus illustrated may be connected, for example, directly to a vapor phase cracking apparatus such as that described in an application filed June 13, 1927, by Harry L. Pelzer, Serial No. 198,621. For example, the vapor mixture escaping from the scrubbing tower or from a subsequent reflux tower or fractionating tower in that apparatus may be supplied to tower 1 through connection 9 and the condensate discharged from tower 1 through connection 22 may be supplied to the heater or to the upper end of the scrubbing tower or to the upper end of a subsequent reflux tower or fractionating tower in that apparatus.

In carrying out the present invention in the apparatus illustrated, the hydrocarbon vapors to be refined are supplied to the upper end of the refining tower 2 through connection 10. These vapors may or may not have been subjected to a preceding fractionating operation, carried out in tower 1 for example. The vapors supplied to the refining tower, however, include with advantage higher boiling vapors as well as vapors forming the desired product, and, when a fractionating operation preceding the refining operation is a part of the complete operation, this fractionating operation is with advantage controlled so that the vapor mixture escaping to the refining operation includes such higher boiling vapors. The fractionating operation, for example, may be controlled so that the vapors escaping to the refining operation form, when condensed, a condensate including 10–50% of constituents higher boiling than suitable as components of the desired product. The raw vapors supplied to the upper end of the refining tower 2 are therein subjected to the action of the adsorptive catalyst and, at the same time, the adsorptive catalyst is subjected to the action of a liquid oil washing agent supplied through connection 21. In tower 3 the total vapor mixture escaping from the lower end of the refining tower 2 through connection 11 is subjected to fractionation controlled so that polymers produced by the vapor-catalyst contact and associated oil components including the oil washing agent are condensed and separated therein. Any other constituents present higher boiling than suitable as components of the desired product may also be separated in this fractionating operation. The vapors escaping from the upper end of tower 3 are condensed to form the refined product. The polymer mixture separated in tower 3 is discharged from the lower end of the tower through connection 13 to the vaporizing tower 6 where, by means of the heat supplied to the lower end of tower 6, the oil components of the polymer mixture are vaporized to be condensed in condenser 7 to form a condensate free from residual tar including the high boiling polymers, the residual material being discharged through connection 15. This condensate, the oil components of the polymer mixture separated from the vapors after passage through the adsorptive catalyst in the refining tower 2, is the liquid washing agent supplied to the upper end of the refining tower through connection 21 during the refining operation. Any excess of this material over that required to be supplied to the refining operation may be discharged through connection 23. The amount of washing agent to be supplied to the refining operation, in carrying out the invention, will vary widely in different operations. Any excess over that required to keep the adsorptive catalyst active for that operating period which gives optimum operating economy is to be avoided. In refining gasoline, for example, the amount of washing agent supplied to the refining operation may be as little as 2% or less or as much as 20% or more on the net refined gasoline produced; with a highly reactive raw gasoline-containing vapor mixture produced by severe vapor phase cracking a larger amount of the washing agent is required than with less reactive raw vapor mixtures.

I claim:

1. In the vapor phase refining of hydrocarbons by passage of the hydrocarbon vapors through an adsorptive catalyst, the improvement which comprises passing the hydrocarbon vapors to be refined through an adsorptive catalyst and separating from these vapors after passage through the adsorptive catalyst high boiling polymers produced by the vapor-catalyst contact and fractionally condensing constituents of the vapors higher boiling than suitable as components of the desired product, vaporizing oil components from the polymers and higher boiling condensate and condensing these vaporized oil components free from residual tar including the high boiling polymers, and passing this oil condensate through the adsorptive catalyst with the hydrocarbon vapors to be refined during the refining operation as a liquid washing agent.

2. In the vapor phase refining of hydrocarbons by passage of the hydrocarbon vapors through an adsorptive catalyst, the improvement which comprises passing the hydrocarbon vapors to be refined through an adsorptive catalyst and then subjecting the total resulting vapor mixture including high boiling polymers produced by the vapor-catalyst contact to a fractionating operation and condensing and separating from the vapor mixture therein the high boiling polymers and constituents of the vapor mixture higher boiling than suitable as components of the desired product, vaporizing oil components from the condensate mixture separated in the fractionating operation and condensing these oil components free from residual tar including the high boiling polymers, and passing this oil condensate through the adsorptive catalyst with the hydrocarbon vapors to be refined during the refining operation as a liquid washing agent.

In testimony whereof I affix my signature.

EUGENE C. HERTHEL.